United States Patent
Rosenblatt et al.

(10) Patent No.: US 9,202,040 B2
(45) Date of Patent: Dec. 1, 2015

(54) CHIP AUTHENTICATION USING MULTI-DOMAIN INTRINSIC IDENTIFIERS

(71) Applicant: International Business Machines Corporation, Armonk, NY (US)

(72) Inventors: Sami Rosenblatt, White Plains, NY (US); Daniel Jacob Fainstein, Beacon, NY (US); Toshiaki Kirihata, Poughkeepsie, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 551 days.

(21) Appl. No.: 13/648,292

(22) Filed: Oct. 10, 2012

(65) Prior Publication Data
US 2014/0100807 A1    Apr. 10, 2014

(51) Int. Cl.
| G06F 19/00 | (2011.01) |
| G06F 21/44 | (2013.01) |
| G06F 21/73 | (2013.01) |
| H04L 9/08  | (2006.01) |
| H04L 9/32  | (2006.01) |

(52) U.S. Cl.
CPC .............. G06F 21/44 (2013.01); G06F 21/73 (2013.01); H04L 9/0866 (2013.01); H04L 9/3278 (2013.01); H04L 2209/12 (2013.01)

(58) Field of Classification Search
CPC ........ G06F 21/57; G06F 21/73; H04L 9/3066
USPC ................... 702/82, 116–118, 182–185, 188
See application file for complete search history.

(56) References Cited

U.S. PATENT DOCUMENTS

| 7,840,803 | B2 | 11/2010 | Clarke et al. | |
| 2006/0187719 | A1 | 8/2006 | Matsumoto et al. | |
| 2011/0164445 | A1 | 7/2011 | Park | |
| 2012/0044777 | A1 | 2/2012 | Fujiwara et al. | |
| 2012/0102334 | A1* | 4/2012 | O'Loughlin et al. | 713/189 |
| 2012/0154008 | A1 | 6/2012 | Kim et al. | |
| 2013/0086385 | A1* | 4/2013 | Poeluev | 713/176 |
| 2014/0103344 | A1* | 4/2014 | Tehranipoor et al. | 257/48 |

FOREIGN PATENT DOCUMENTS

WO    WO2011115648 A1    9/2011

OTHER PUBLICATIONS

Suzuki; The Development of Embedded DRAM Statistical Quality Models at Test and Use Conditions, A thesis submitted in partial fulfillment of the requirements for the degree of Master of Science in Electrical and Computer Engineering; Portland State University, 2010.

Arazi; Interleaving security and efficiency considerations in the design of inexpensive IC cards; IEE Proc.-Comput. Digit. Tech.; vol. 141, No. 5; Sep. 1994.

(Continued)

*Primary Examiner* — Edward Raymond
(74) *Attorney, Agent, or Firm* — H. Daniel Schnurmann; Howard M. Cohn (57) ABSTRACT

Embodiments of the present invention provide a chip authentication system using multi-domain intrinsic identifiers. Multiple intrinsic identifiers taken from multiple domains (areas or sections of the chip) are compared against the intrinsic identifiers collected during the manufacture of the chip. If at least one intrinsic identifier matches those collected during manufacture, the chip may be designated as authentic.

20 Claims, 9 Drawing Sheets

(56) References Cited

OTHER PUBLICATIONS

Fujiwara et al; A Chip-ID Generating Circuit for Dependable LSI using Random Address Errors on Embedded SRAM and On-Chip Memory BIST; 2011 Symposium on VLSI Circuits Digest of Technical Papers.

Su et al.; A 1.6pJ/bit 96% Stable Chip-ID Generating Circuit using Process Variations; Solid-State Circuits Conference, 2007; ISSCC 2007; Digest of Technical Papers. IEEE International.

* cited by examiner

CHIP AUTHENTICATION USING MULTI-DOMAIN INTRINSIC IDENTIFIERS

FIELD OF THE INVENTION

The present invention relates generally to semiconductors, and more particularly, to methods and systems for implementing integrated circuit chip authentication.

BACKGROUND OF THE INVENTION

Counterfeit electronic components have become a serious concern in recent years. Counterfeit electronic components can jeopardize the performance and reliability of the products in which they are used. Counterfeit component detection may employ the use of chip identification in the form of a physical unclonable function (PUF). A PUF is a function that is embodied in a physical structure and is easy to evaluate but hard to predict. Ideally, an individual PUF device must be easy to make but practically impossible to duplicate, even given the exact manufacturing process that produced it. As there is an ever-increasing need for data security and authentication, it is desirable to have improved methods and circuits for implementing chip authentication.

SUMMARY OF THE INVENTION

In one embodiment, a method for authenticating an integrated circuit chip is provided. The method includes establishing multiple domains for the chip, recording at least one identification string from each of a first subset of domains from the multiple domains of the chip during manufacture of the chip, wherein the first subset comprises at least two domains, receiving a second subset of identification strings from at least two domains of the chip during an authentication attempt, wherein the second subset of the identification strings is a subset of the first subset of identification strings, comparing the second subset of the received identification strings with the recorded identification strings, and designating the chip as authentic in response to a third subset of the received identification strings matching recorded identification strings, wherein the third subset of the identification strings is a subset of the second subset of identification strings.

In another embodiment, a method for generating authentication information for a chip is provided. The method includes generating at least one retention bitmap for a plurality of domains of the chip, and creating an identification string for each generated retention bitmap. In another embodiment, a chip authentication system is provided. The system includes a chip, the chip comprising a testing interface, a chip tester, the chip tester configured and disposed to communicate with the chip via the testing interface. The chip tester further includes a network interface, and a manufacturing authenticating system. The manufacturing authenticating system includes a network interface, and a database comprising at least two identification strings for the chip.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. In some cases, in particular pertaining to signals, a signal name may be oriented very close to a signal line without a lead line to refer to a particular signal, for illustrative clarity.

In some cases, similar elements may be referred to by similar numbers in various figures (FIGs) of the drawing, in which case typically the last two significant digits may be the same, the most significant digit being the number of the drawing figure (FIG). Furthermore, for illustrative clarity, some reference numbers and/or features may be omitted in certain drawings.

DETAILED DESCRIPTION

Chip identification can take the form of an extrinsic identifier or an intrinsic identifier. An extrinsic identifier may take the form of something such as a unique data value programmed into a non-volatile memory location. A disadvantage of extrinsic identifiers is that they are prone to being copied, faked, or discovered by physical inspection. An intrinsic identifier is based on an intrinsic physical property of the chip. The intrinsic property may be based on a resistance, capacitance, or other feature within the chip. An intrinsic identifier can serve as a physical unclonable function (PUF) if it is chosen such that it is unique amongst samples (e.g. each individual chip has a different value for the intrinsic identifier), and cannot be copied or discovered through physical inspection.

In the case of dynamic random access memory (DRAM), a retention bitmap can serve as a PUF. In normal operation, a DRAM memory array needs to be periodically refreshed to preserve its data contents. For testing purposes, a retention bitmap can be used to assess the retention capability of bits in a DRAM array. With the refresh circuitry disabled or slowed, a logical 1 may be written to each location within a DRAM. At a predetermined time after that, the data is read. With a sufficient time interval (e.g. 100 microseconds), some bits may lose their charge, and read as a logical 0. The location and number of bits that fail within a given region of the memory is unique when the number of bits tested is large enough. Hence, a retention bitmap is a good candidate for use as a PUF.

However, one problem with intrinsic identifiers is that they can change over time due to stress and/or aging of the integrated circuit. This poses a challenge to the use of intrinsic identifiers as a PUF for authentication. For example, after a chip is in constant use for three years, there exists a probability that a retention bitmap may change over time.

Embodiments of the present invention mitigate this problem by using multiple domains. A domain refers to a particular section of a DRAM array. In one embodiment, a domain represents 4096 contiguous bits, although other domain sizes are possible. With such a domain size, in the case of a 4 Gbit DRAM array, there can be over one million domains.

Embodiments of the present invention establish multiple domains. For example, in a DRAM array of 4 Gbit, ten domains, each of size 4096 bits (512 bytes) may be established. A retention bitmap is obtained from each of the ten domains during the manufacturing process. An identification string is derived from the retention bitmap. The identification string may be the data values of the DRAM contents. In some embodiments, the identification string may be the inverse of the data values of the DRAM contents. In the inverse case, the number of "1" values in an identification string indicates the number of failures in a particular retention bitmap. The identification strings are stored in a database of a manufacturing authenticating system (MAS). Note that while in the aforementioned example, each domain is 4096 bits, there are embodiments in which the domain size differs amongst the various domains. For example, some domains may have a size of 4096 bits, where other domains have a size of 16384 bits.

After the chip has been shipped to customers, the customer can verify the authenticity of the chip by performing the retention bitmap test on the ten domains and sending the corresponding identification strings to the manufacturing authenticating system (MAS). The MAS checks the domains, and if a subset of the domains is found, the chip is designated as authentic.

Hence, even if one or more of the retention bitmaps change due to aging or stress of the device, there is a high probability that at least one domain from the subset will continue to function as it had during the manufacturing process, thus allowing the chip to be authenticated.

In general, embodiments of the present invention establish M domains within a chip (e.g. within a DRAM array) to be used for authentication. The M domains may be a first subset of the entirety of domains within the DRAM array. During authentication, identification strings from N domains within the chip are sent to a MAS, where N ranges from 2 to M. The N domains represent a second subset of domains that is a subset of the first set of domains (M). Within the MAS, K identification strings are required to match an existing record in the MAS in order to designate a chip as authentic, where K ranges from 1 to N. The K domains represent a third subset of domains that is a subset of the second set of domains (N). The value of K can be selected to fit the application. The value of K represents a design tradeoff between reliability and security. When K=1, reliability is maximized, since all but one of the N domains can fail, and the chip can still be authenticated. When K=N, security is maximized, since all N domains must match in order for the chip to be authenticated. In practice, K is selected to be less than N, such that there is some tolerance for aging and stress within the chip.

Figure 1:
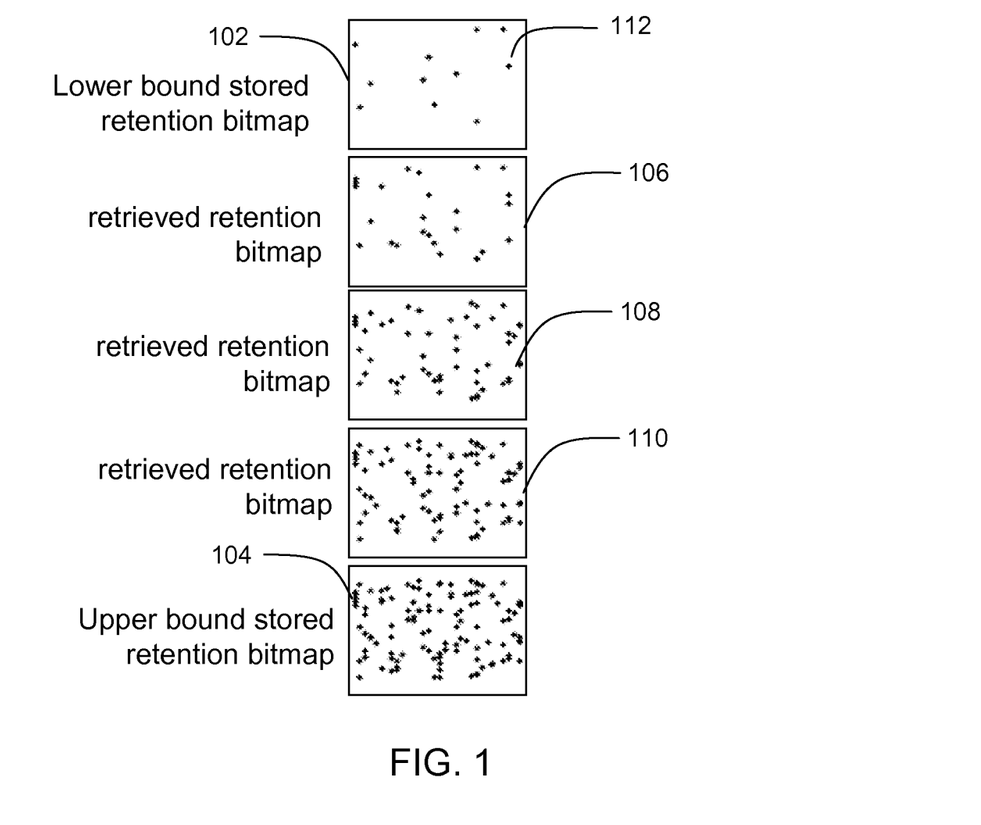
FIG. 1 shows representations of exemplary retention bitmaps.

FIG. 1 shows representations of exemplary retention bitmaps. For a given domain, multiple retention bitmaps may be obtained. Various parameters, such as wait time (the time between the write of data and reading that data back), and operating voltages can be adjusted to obtain different retention bitmaps. Retention bitmap 102 represents a retention bitmap stored during the manufacturing process. Each dot (shown generally as reference 112) represents a failed bit within the domain. Retention bitmap 104 represents another bitmap for the same domain that is stored during the manufacturing process. Retention bitmap 104 has more errors than retention bitmap 102. In one embodiment, retention bitmap 104 was obtained using a longer wait time than retention bitmap 102. In one embodiment, the wait time for retention bitmap 102 ranges from 70 to 100 microseconds, and the wait time for retention bitmap 104 ranges from 250 to 300 microseconds. Retention bitmap 102 may be referred to as a lower bound retention bitmap. Retention bitmap 104 may be referred to as an upper bound retention bitmap. A DRAM cell that fails at 70 microseconds will also reliably fail at 250 microseconds. Hence, the upper bound retention bitmap 104 is a superset of the lower bound retention bitmap 102. That is, every failure in lower bound retention bitmap 102 is also present in upper bound retention bitmap 104.

Retention bitmaps 106, 108, and 110 are retrieved retention bitmaps. Retention bitmaps 106, 108 and 110 each have the same errors as lower bound stored retention bitmap 102, but do not have any errors that are not also present in upper bound retention bitmap 104. Hence, retention bitmaps 106, 108 and 110 each meet the criterion for successful authentication. If a retrieved bitmap does not contain every error within lower bound stored retention bitmap 102, it is not considered as a match to the stored bitmaps. Similarly, if a retrieved bitmap contains an error that is not within upper bound stored retention bitmap 104, it is not considered as a match to the stored bitmaps.

Figure 2:
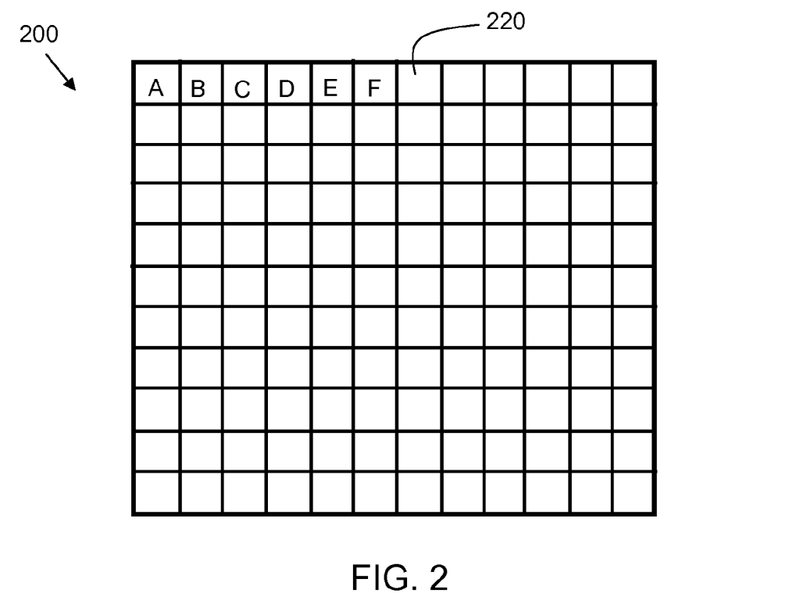
FIG. 2 shows an example of a DRAM array with multiple domains.

FIG. 2 shows an example of a DRAM array 200 with multiple domains. A domain is designated generally with reference 220. A subset of the domains, designated by letters A-F is used for generating retention bitmaps for authentication purposes.

Figure 3:
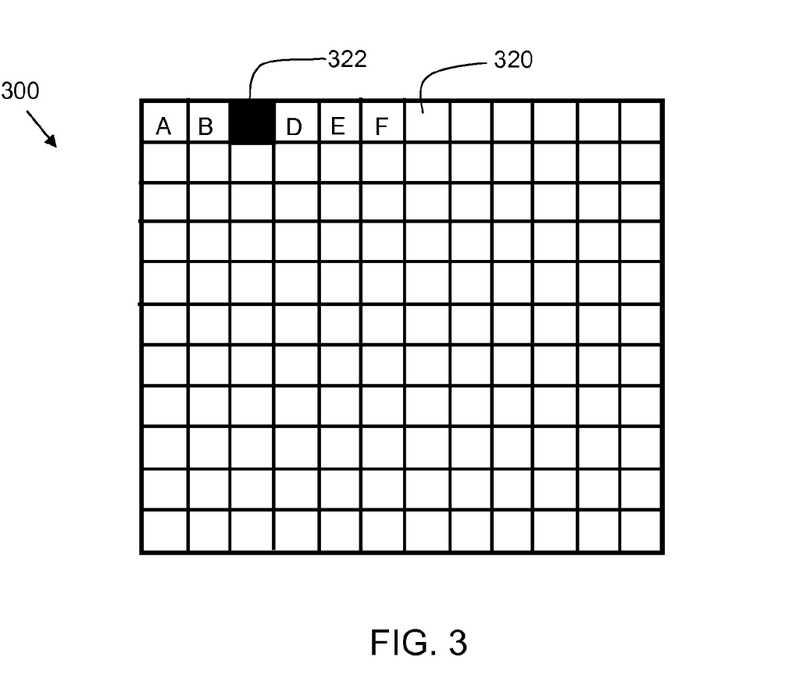
FIG. 3 shows an example of a DRAM array with a failed domain.

FIG. 3 shows an example of a DRAM array 300 with a failed domain 322. In the event of a failure within domain 322, the retrieved retention bitmap from domain 322 no longer matches a corresponding identification string stored in the manufacturing authenticating system (MAS). In this case, other domains (A, B, D, E, and F) are still operational, and can be used for authentication.

Figure 4:
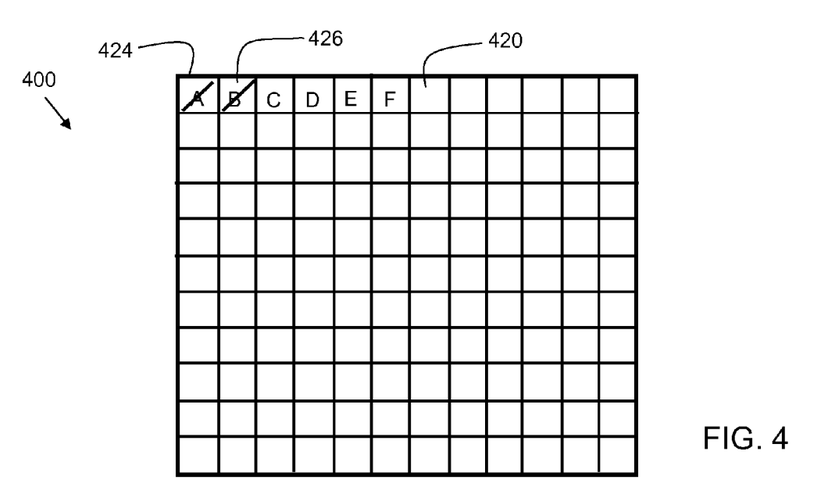
FIG. 4 shows an example of a DRAM array with mistrusted domains.

FIG. 4 shows an example of a DRAM array 400 with mistrusted domains. In this case, domains A and B (references 424 and 426) are designated as mistrusted. This can occur when a manufacturer suspects that an identification string has been copied, spoofed, or otherwise compromised. In this case, identification strings derived from domains A and B are no longer considered by the manufacturing authenticating system (MAS). Other domains (C, D, E, and F) continue to be trusted, and eligible for use in authentication.

Figure 5:
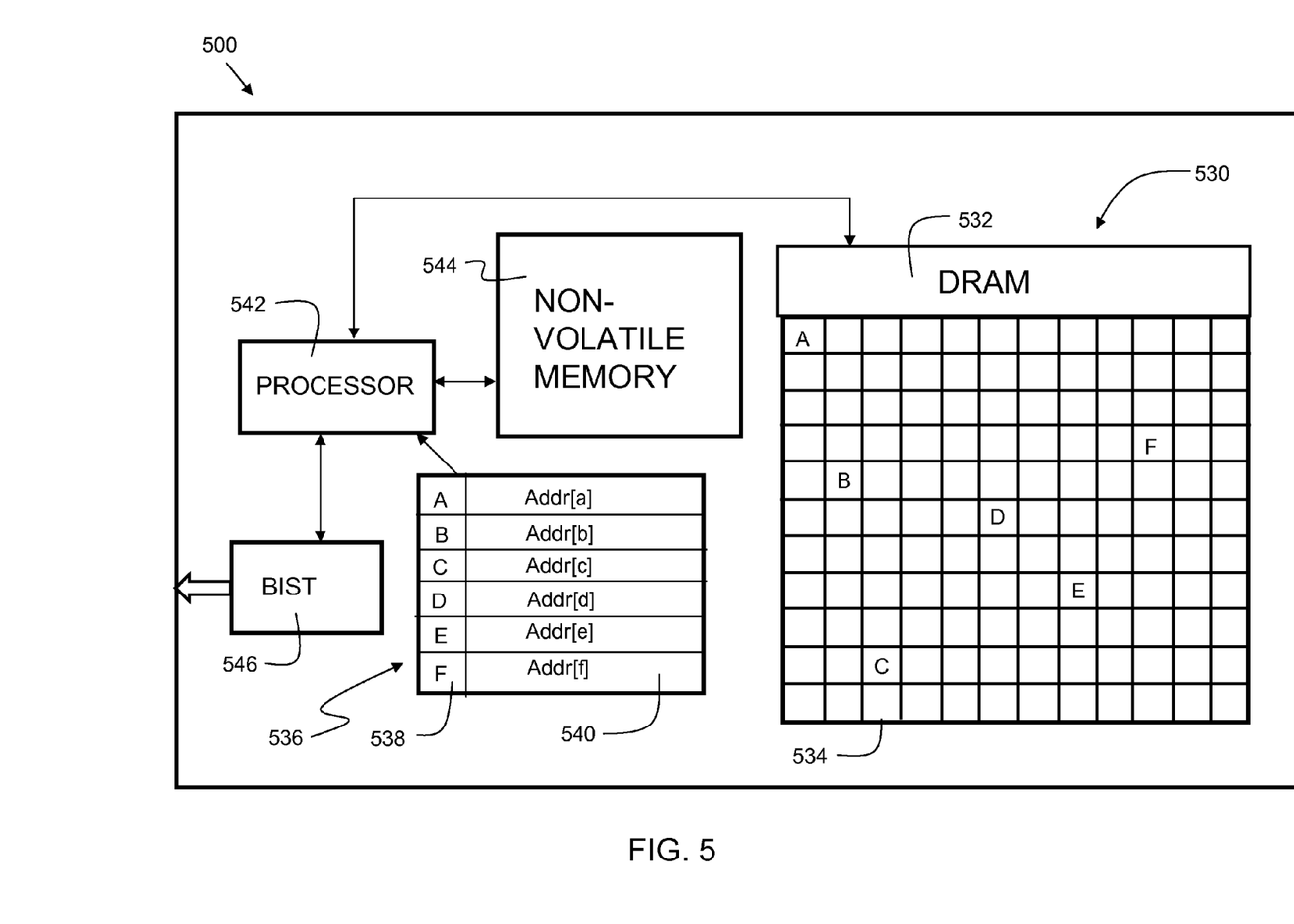
FIG. 5 shows a block diagram of a chip in accordance with an embodiment of the present invention.

FIG. 5 shows a block diagram of a chip 500 in accordance with an embodiment of the present invention. Chip 500 comprises DRAM module 530. DRAM module 530 comprises a DRAM controller 532 which is configured and disposed to control DRAM array 534. A processor 542 is configured and disposed to access the DRAM module 530 via the DRAM controller 532. Non-volatile (non-transitory) memory 544 may be implemented via SRAM or other suitable technology. Processor 542 is configured and disposed to access non-volatile memory 544. Non-volatile memory 544 stores machine instructions that control the operation of chip 500 when executed by processor 542. Processor 542 is also configured and disposed to communicate with built-in self test (BIST) module 546, which may comprise a scan chain module, JTAG module, or other suitable technology to communicate the state of the chip 500 to external sources, and receive data and instructions for conducting tests, and receiving requests for identification strings derived from retention bitmaps from multiple domains within DRAM array 534. In some embodiments, certain elements, such as processor 542 may reside in a separate chip from DRAM module 530. In this case, processor 542 may access DRAM module 530 via an external bus (not shown). In some embodiments, multiple DRAM modules may be used, with domains from the multiple DRAM modules (chips) being used for authentication.

The domains (A-F) used for generating retention bitmaps need not be arranged sequentially. As shown in DRAM array 534, domains A-F are distributed randomly throughout the array. In one embodiment, a one-time programmable non-volatile memory stores a domain location table 536. The domain location table comprises a domain column 538, and a location column 540. For each domain (A-F), a corresponding location designator, or address (Addr[a]-Addr[f]) within the DRAM array 534 is stored in the domain location table 536. The domain location table may be established during the manufacturing of the chip. Random domains and their corresponding locations may be stored in the domain location table 536. In some embodiments, the information in the domain location table 536 is stored encrypted. In some embodiments, different physical samples of a chip use different domains, such that no two chips use the exact same domains. This may serve to provide additional level of protection against reverse-engineering attempts.

Figure 6:
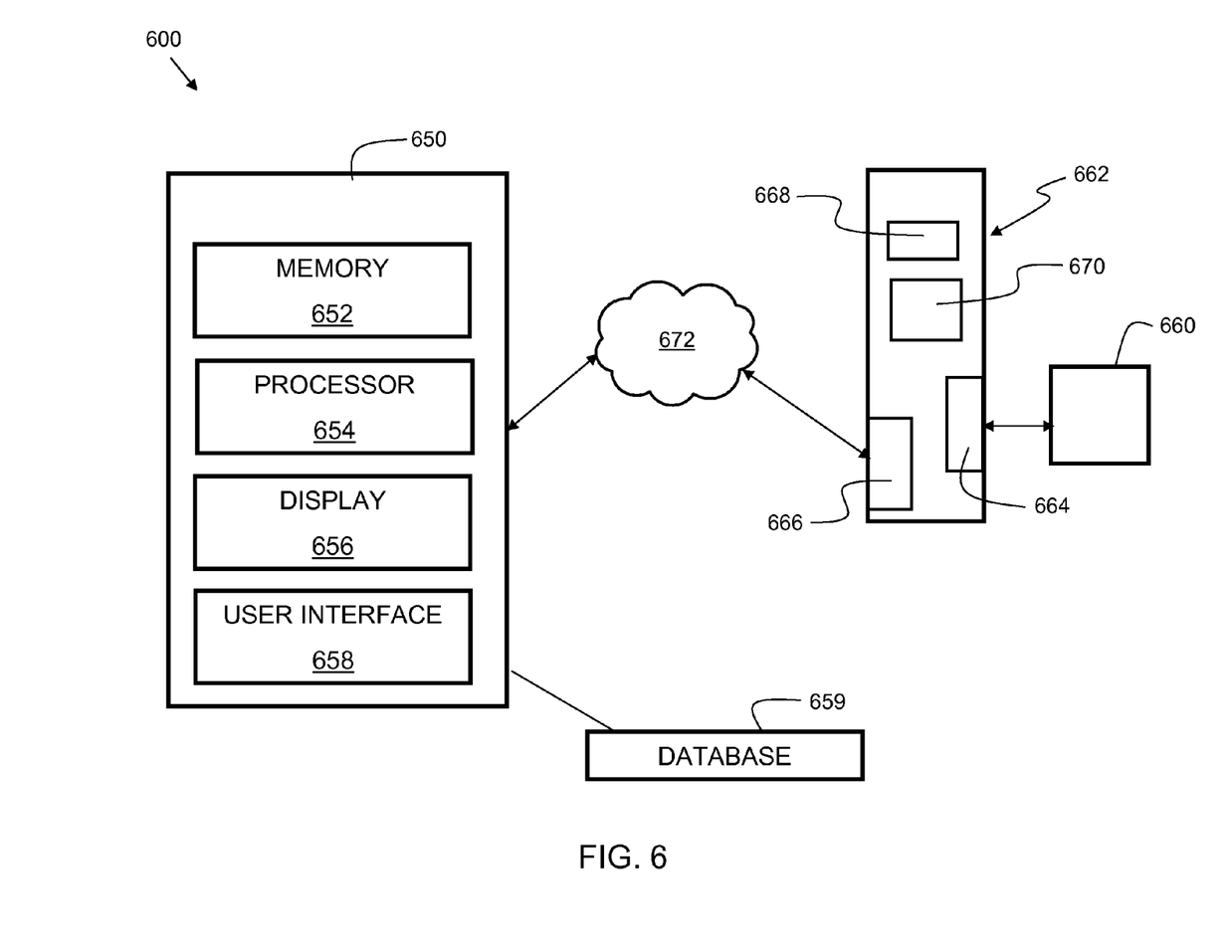
FIG. 6 shows a block diagram of a system in accordance with an embodiment of the present invention.

FIG. 6 shows a block diagram of a system 600 in accordance with an embodiment of the present invention. System 600 comprises manufacturing authenticating system (MAS) 650. MAS 650 may be a computer comprising memory 652, and a processor 654 which is configured to read and write memory 652. The memory 652 may be non-transitory memory, such as flash, ROM, non-volatile static ram, or the like. The memory 652 contains instructions that, when executed by processor 654, control the various subsystems to operate MAS 650. MAS 650 may also comprise a display 656 and a user interface 658 for interacting with the MAS 650. The user interface 658 may comprise a keyboard, touch screen, mouse, or the like.

The MAS 650 accesses database 659 to store identification strings during the fabrication process. In one such use, each chip that passes all quality tests, and thus is ready to be sold to a customer, has one or more identification strings from at least two domains of each chip stored in database 659. In some embodiments, the identification strings are stored in a compressed format, such as by applying run-length encoding. In some embodiments, the identification strings are stored in an encrypted format. In some embodiments, the identification strings are stored by processing each of the identification strings with a one-way hash function to derive a hash value for each of the identification strings and recording each hash value.

Once a chip 660 is sold, and has left the manufacturer, chip 660 may be authenticated at one or more points within the supply chain. For example, a circuit board assembly facility may wish to confirm some or all of a particular chip to ensure authenticity. The chip 660 may be connected to a chip tester 662. Chip tester 662 may comprise a test interface 664 (e.g. a JTAG interface), a processor 668, non-transitory memory 670 and network interface 666. Non-transitory memory 670 contains instructions, that when executed by processor 668, control the operation of chip tester 662. The chip tester 662 is configured and disposed to communicate with MAS 650 via a communications network 672. In one embodiment, network 672 comprises the Internet. In some embodiments, the chip tester 662 may be embedded within chip 660 as a built-in test engine, or may reside on a different chip within an electronic system that includes chip 660.

Non-transitory memory 670 may contain instructions to perform retention tests on multiple domains within chip 660, and receive multiple identification strings corresponding to those retention tests from chip 660. The received multiple identification strings are sent to the MAS 650 via network 672. The MAS 650 searches database 659 in an attempt to find one or more matching identification strings. The MAS 650 then sends an authentication result to the customer. The authentication result is successful if a predetermined number of matches are found. The authentication result is failure if a predetermined number of matches are not found. The authentication result may be communicated to the customer electronically (e.g. via an e-mail to the customer).

In another embodiment, when a customer desires to authenticate chip 660, the tester 662 first sends an authentication request to the MAS 650. The MAS 650 responds with a challenge, which contains a numeric range for an error count within the retention bitmap. That is, the MAS 650 may specify the range of the number of errors (error count range) it is expecting in the ensuing identification strings. The chip tester 662 then performs a bitmap retention tests on multiple domains within chip 660 and returns multiple identification strings meeting the criteria established in the challenge.

For example, the chip tester 662 may send an authentication request to the MAS 650. In response, the MAS 650 responds with a challenge indicating an error count range of 30 to 60. The chip tester then performs retention tests on the predetermined domains (e.g. A-F of FIG. 2) and returns identification strings that meet the criterion. For example, suppose that the error count for each domain is as follows:

| DOMAIN | NUMBER OF ERRORS |
|---|---|
| A | 24 |
| B | 33 |
| C | 55 |
| D | 71 |
| E | 48 |
| F | 44 |

Then, in response to a challenge with an error count range of 30 to 60, identification strings from domains B, C, E, and F are returned (since the error count for those domains is within the range of 30 to 60). By having a range of different error counts in the domains, different subsets of domains can be selected for authentication purposes, controlled by the MAS. For example, if domain B became compromised or suspected of being compromised, the MAS can issue a challenge with a lower limit above 33 (the error count of domain B) to exclude that domain during future authentications.

Figure 7:
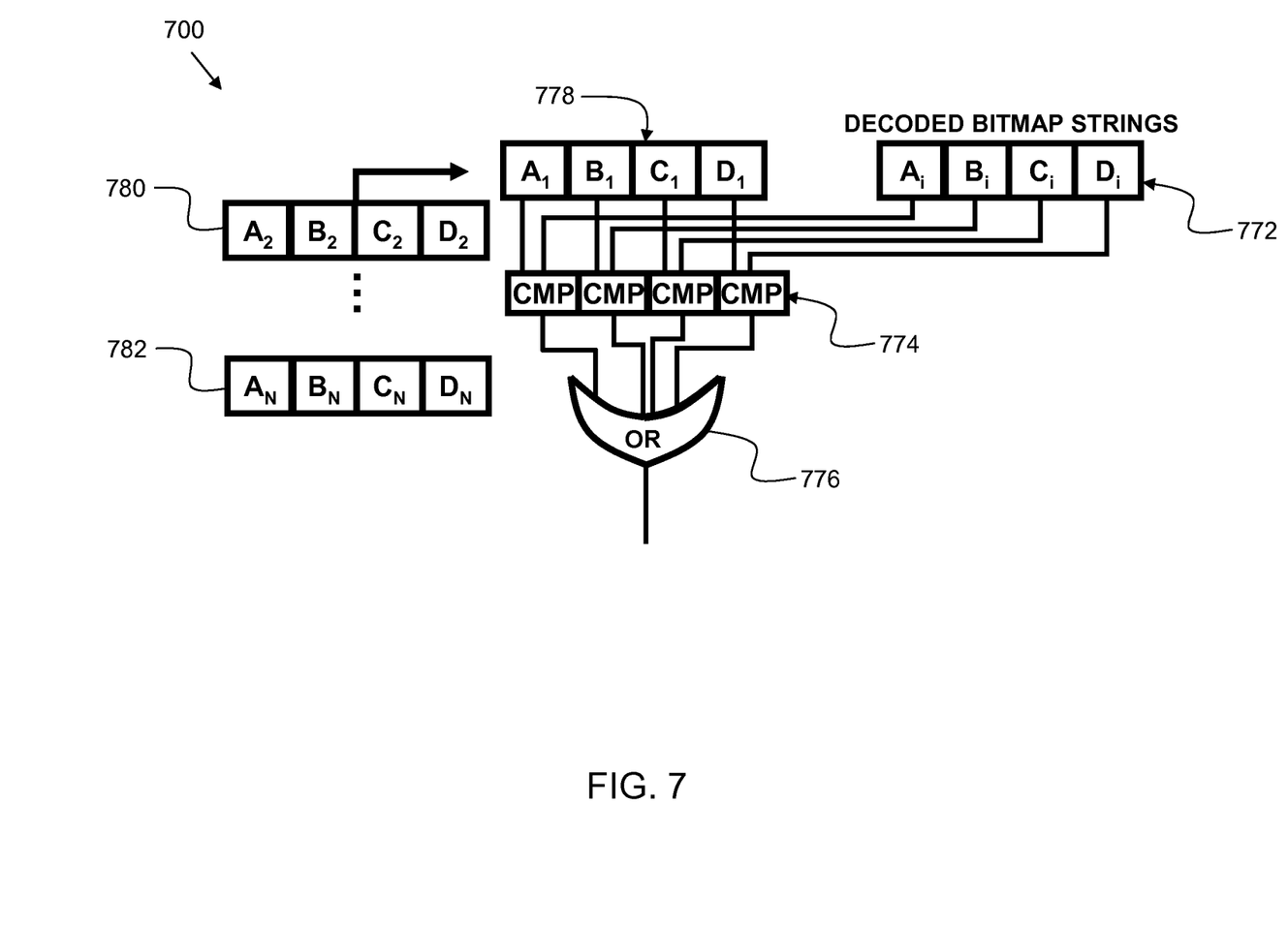
FIG. 7 shows a schematic representation of an authentication operation in accordance with an embodiment of the present invention.

FIG. 7 shows a schematic representation 700 of an authentication operation in accordance with an embodiment of the present invention. Multiple decoded bitmap strings 772 are received from a chip that is to be authenticated. The received decoded bitmap strings 772 are compared against all sets of stored decoded bitmap strings 778, 780 and 782 by comparison module 774. The comparison module compares each domain. There is an output of the comparison module for each domain. The outputs are logically OR'ed together via OR 776. The output of OR 776 indicates the authentication result. In this embodiment, an identification string from exactly one domain needs to match in order to result in a successful authentication. In other embodiments, identification strings from more than one domain is required to match in order to result in a successful authentication. In some embodiments, identification strings from two to ten domains are required to match in order to result in a successful authentication.

Figure 8:
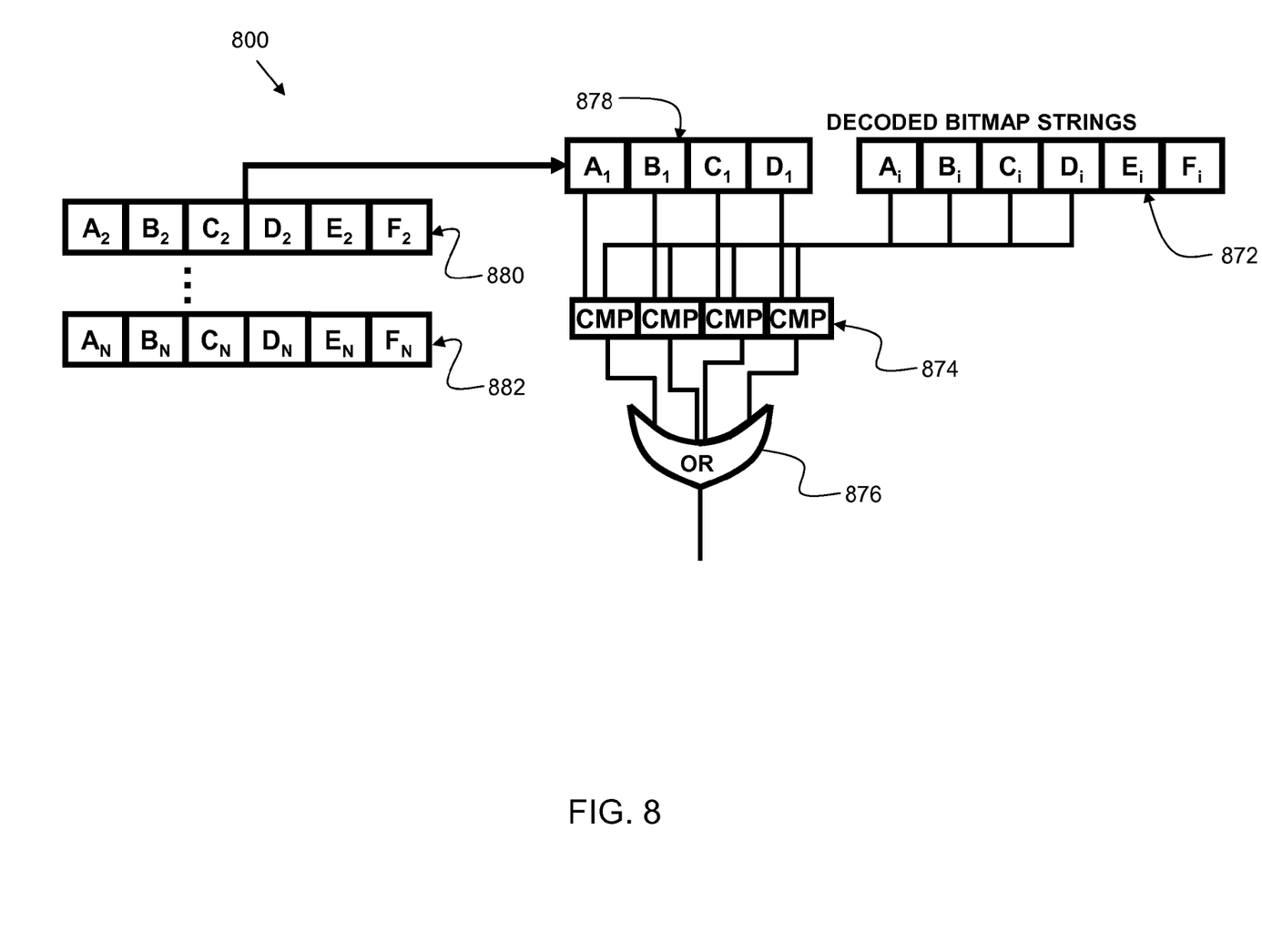
FIG. 8 shows a schematic representation of an authentication operation in accordance with an alternative embodiment of the present invention.

FIG. 8 shows a schematic representation 800 of an authentication operation in accordance with an alternative embodiment of the present invention. Multiple decoded bitmap strings 872 are received from a chip that is to be authenticated. However, the number of bitmap strings received corresponds to a subset of the total number of domains available. In this example, there are six domains (A-F), but only four domains (A-D) are received for authentication. Unused domains E and F may be used in the future as needed due to domain failure or compromised identification strings. The received decoded bitmap strings 872 are compared against all sets of stored decoded bitmap strings 878, 880 and 882 by comparison module 874. The comparison module compares each domain. There is an output of the comparison module for each domain. The outputs are logically OR'ed together via OR 876. The output of OR 876 indicates the authentication result. In this embodiment, an identification string from exactly one domain needs to match in order to result in a successful authentication. In other embodiments, identification strings from more than one domain is required to match in order to result in a successful authentication. In some embodiments, identification strings from two to ten domains are required to match in order to result in a successful authentication.

Figure 9:
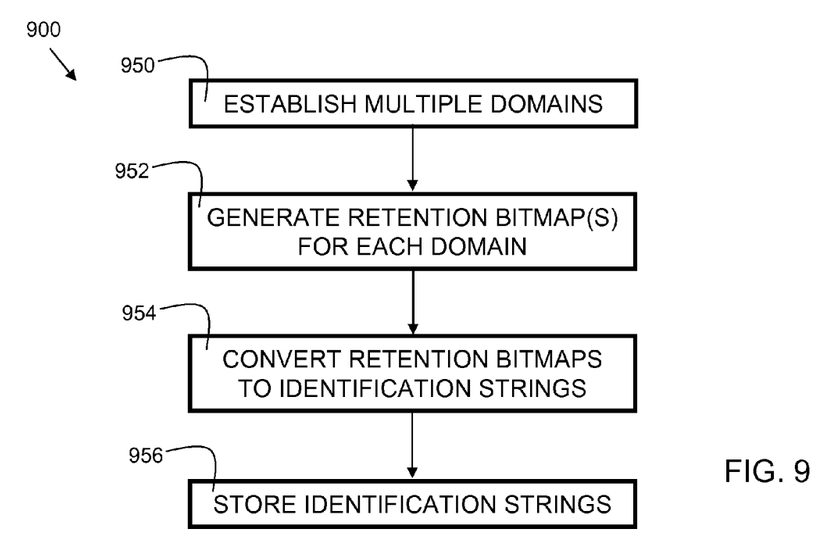
FIG. 9 is a flowchart of a manufacturing process in accordance with an embodiment of the present invention.

FIG. 9 is a flowchart 900 of a manufacturing process in accordance with an embodiment of the present invention. In process step 950, multiple domains are established. The domains may represent various regions of a DRAM array. The domains may be contiguous (see A-F of FIG. 2). The domains may be non-contiguous (see A-F of FIG. 5). In process step 952, at least one retention bitmap is generated for each domain by performing a retention test. In some embodiments, multiple retention bitmaps are generated for each domain. In one embodiment, a lower bound retention bitmap and an upper bound retention bitmap are generated (see 102 and 104 of FIG. 1). In process step 954, the retention bitmaps are converted to identification strings. The conversion of retention bitmaps to identification strings may comprise inverting the data value for each bit during a read operation of the DRAM bits in the domain. In process step 956, the identification strings are stored. The identification strings may be stored in a database (see 659 of FIG. 6). In one embodiment, the identification strings may be stored encrypted in the database. In another embodiment, the identification strings are processed through a one-way hash function, such as MD5, and the resulting hashed value is stored in the database.

Figure 10:
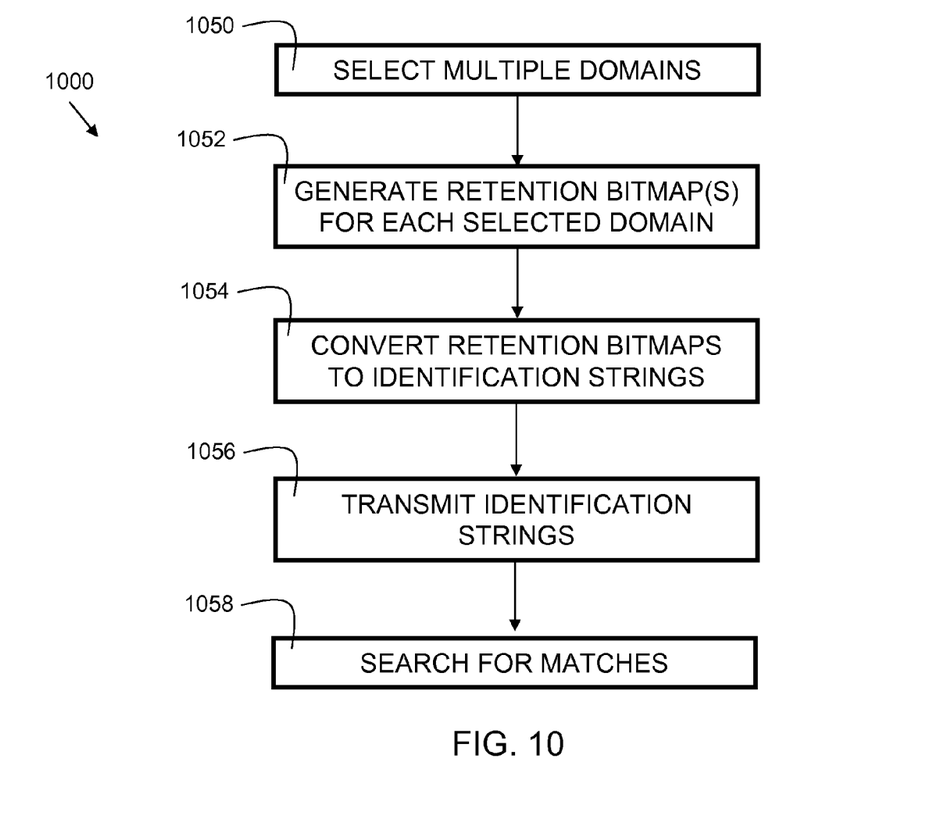
FIG. 10 is a flowchart of an authentication process in accordance with an embodiment of the present invention.

FIG. 10 is a flowchart 1000 of an authentication process in accordance with an embodiment of the present invention. In process step 1050, multiple domains are selected. The number of domains selected may be less than the total number of domains designated for authentication. In one embodiment, 100 domains are designated for authentication, and four domains are selected for any given authentication attempt. In some embodiments, with each authentication attempt, the next four domains are selected. When all the domains have been used, the process may repeat using the initial four domains. In some embodiments, the chip is designated as inauthentic (authentication failure) in response to receiving the same set of identification strings in two consecutive authentication attempts. In another embodiment, the four domains are selected randomly. Note that the values of 100 for the total domains and 4 for the number of domains used for each authentication attempt are merely exemplary. In general, embodiments of the present invention establish M domains within a chip (e.g. within a DRAM array). During the manufacturing process, all M domains are recorded in the MAS database. During authentication, identification strings from N domains (where N ranges from 2 to M) within the chip are sent to the MAS.

In process step 1052, at least one retention bitmap is generated for each domain by performing a retention test. In some embodiments, multiple retention bitmaps are generated for each domain. In one embodiment, a lower bound retention bitmap and an upper bound retention bitmap are generated (see 102 and 104 of FIG. 1). In process step 1054, the retention bitmaps are converted to identification strings. The conversion of retention bitmaps to identification strings may comprise inverting the data value for each bit during a read operation of the DRAM bits in the domain. In some embodiments, the conversion may comprise encrypting the identification string. In some embodiments, the conversion may comprise performing data compression on the identification string.

In process step 1056, the identification strings are transmitted to a manufacturing authenticating system (MAS) (see 650 of FIG. 6). In process step 1058, the MAS database (see 658 of FIG. 6) is searched for the received identification strings. If the desired number of matches is found, the chip is deemed to have successfully authenticated (see FIGS. 7 and 8 for the schematic representation of the authentication process).

Figure 11:
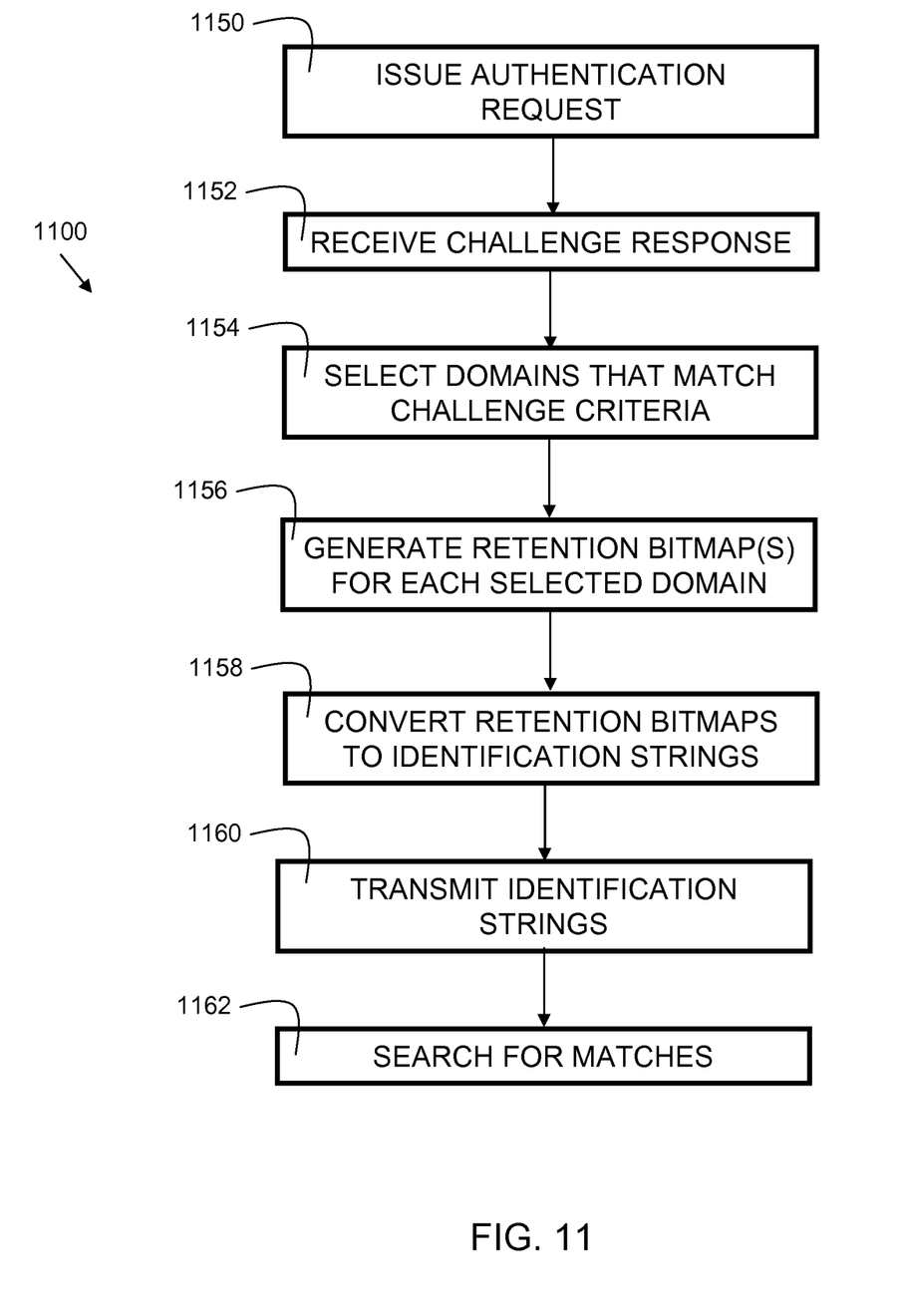
FIG. 11 is a flowchart of an authentication process in accordance with an alternative embodiment of the present invention.

FIG. 11 is a flowchart 1100 of an authentication process in accordance with an alternative embodiment of the present invention. In process step 1150, an authentication request is issued from a chip tester (see 662 of FIG. 6) to a manufacturing authenticating system (MAS) (see 650 of FIG. 6). In process step 1152, a challenge response is received from the MAS. The challenge response contains an error count range, and may possibly contain other criteria. In process step 1154, domains are selected that mach the challenge criteria, including the error count range. In process step 1156, at least one retention bitmap is generated for each domain by performing a retention test. In some embodiments, multiple retention bitmaps are generated for each domain. In one embodiment, a lower bound retention bitmap and an upper bound retention bitmap are generated (see 102 and 104 of FIG. 1). In process step 1158, the retention bitmaps are converted to identification strings. The conversion of retention bitmaps to identification strings may comprise inverting the data value for each bit during a read operation of the DRAM bits in the domain. In process step 1160, the identification strings are transmitted to a manufacturing authenticating system (MAS) (see 650 of FIG. 6). In process step 1162, the MAS database (see 659 of FIG. 6) is searched for the received identification strings. If the desired number of matches is found, the chip is deemed to have successfully authenticated (see FIGS. 7 and 8 for the schematic representation of the authentication process).

As can now be appreciated, embodiments of the present invention provide a chip authentication system using multi-domain intrinsic identifiers. The systems and methods disclosed herein address the issue of a physical unclonable function (PUF) changing over time due to stress or aging of an integrated circuit chip. Multiple intrinsic identifiers taken from multiple domains (areas or sections of the chip) are compared against the intrinsic identifiers collected during the manufacture of the chip. In some embodiments, if at least one intrinsic identifier matches those collected during manufacture, the chip may be designated as authentic. In other embodiments, more than one intrinsic identifier needs to match in order to consider the chip as authentic.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method for authenticating an integrated circuit chip, comprising:
   establishing multiple domains for the chip;
   recording at least one identification string from each of a first subset of domains from the multiple domains of the chip during manufacture of the chip, wherein the first subset comprises at least two domains;
   receiving a second subset of identification strings from at least two domains of the chip during an authentication attempt, wherein the second subset of the identification strings is a subset of the first subset of identification strings;
   comparing the second subset of the received identification strings with the recorded identification strings; and
   designating the chip as authentic in response to a third subset of the received identification strings matching recorded identification strings, wherein the third subset of the identification strings is a subset of the second subset of identification strings.

2. The method of claim 1, wherein recording at least one identification string from each domain of the chip during manufacture of the chip comprises recording identification strings derived from an intrinsic physical property of the chip.

3. The method of claim 2, wherein recording identification strings derived from an intrinsic physical property of the chip comprises recording identification strings derived from a retention bitmap.

4. The method of claim 3, wherein recording identification strings derived from a retention bitmap comprises inverting logical values of the retention bitmap.

5. The method of claim 3 wherein recording identification strings derived from a retention bitmap comprises recording a lower bound retention bitmap and an upper bound retention bitmap for each domain.

6. The method of claim 3, wherein recording identification strings derived from a retention bitmap comprises recording an encrypted identification string.

7. The method of claim 1, wherein establishing multiple domains for the chip comprises establishing multiple domains of at least two different sizes.

8. The method of claim 3, wherein recording identification strings derived from a retention bitmap comprises:
   processing each of the identification strings with a one-way hash function to derive a hash value for each of the identification strings; and
   recording each hash value.

9. The method of claim 1, wherein designating the chip as authentic comprises matching exactly one received identification string with a recorded identification string.

10. The method of claim 1, wherein designating the chip as authentic comprises matching two to ten received identification strings with recorded identification strings.

11. The method of claim 1, further comprising designating the chip as inauthentic in response to receiving the same set of identification strings in two consecutive authentication attempts.

12. A method for generating authentication information for a chip, comprising:
    generating at least one retention bitmap for a plurality of domains of the chip; and
    creating an identification string for each generated retention bitmap.

13. The method of claim 12, further comprising:
    generating a lower bound retention bitmap and an upper bound retention bitmap for each domain.

14. The method of claim 12, wherein establishing multiple domains for the chip comprises storing a location designator for each domain.

15. The method of claim 12, wherein creating an identification string for each generated retention bitmap comprises inverting logical values of the generated retention bitmap.

16. The method of claim 12, further comprising transmitting at least one identification string for at least two domains, wherein the at least two domains are selected randomly.

17. The method of claim 12, further comprising:
    sending an authentication request to a manufacturing authenticating system;
    receiving a challenge response from the manufacturing authenticating system, wherein the challenge response contains an error count range;
    selecting domains that correspond to retention bitmaps having error counts within the error count range; and
    transmitting identification strings corresponding to the retention bitmaps of the selected domains.

18. A chip authentication system, comprising:
    a chip, the chip comprising a testing interface;
    a chip tester, the chip tester configured and disposed to communicate with the chip via the testing interface, wherein the chip tester further comprises a network interface;
    a manufacturing authenticating system, wherein the manufacturing authenticating system comprises a network interface;
    a processor;
    a non-transitory memory, wherein the processor is configured to access the non-transitory memory, wherein the non-transitory memory contains instructions, and that when executed by the processor, perform the steps of:
    establishing multiple domains for the chip;
    recording at least one identification string from each of a first subset of domains from the multiple domains of the chip during manufacture of the chip, wherein the first subset comprises at least two domains;
    receiving a second subset of identification strings from at least tow domains of the chip during an authentication attempt, wherein the second subset of the identification strings is a subset of the first subset of identification strings;
    comparing the second subset of the received identification strings with the recorded identification strings; and
    designating the chip as authentic in response to a third subset of the received identification strings matching recorded identification strings, wherein the third subset of the identification strings is a subset of the second subset of identification strings.

19. The system of claim 18, wherein the testing interface comprises a JTAG interface.

20. The system of claim 18, wherein the chip tester and the manufacturing authenticating system are configured and disposed to communicate with each other via the Internet.

* * * * *